United States Patent
Robinett et al.

(10) Patent No.: US 7,140,578 B1
(45) Date of Patent: Nov. 28, 2006

(54) CABLE DUCT WITH PUNCHOUTS

(75) Inventors: Doug Robinett, Overland Park, KS (US); Mark Coulas, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 71 days.

(21) Appl. No.: 10/896,266

(22) Filed: Jul. 21, 2004

(51) Int. Cl.
*F16L 3/00* (2006.01)

(52) U.S. Cl. .......................................................... 248/49

(58) Field of Classification Search .............. 174/71 R, 174/70 R, 41, 40, 40 R, 68.1, 68.3, 101; 248/68.1, 49, 56
See application file for complete search history.

(56) References Cited

U.S. PATENT DOCUMENTS

| | | | | |
|---|---|---|---|---|
| 1,506,330 A | * | 8/1924 | Vandy ...................... | 174/70 R |
| 1,921,115 A | * | 5/1933 | Allen .......................... | 174/46 |
| 1,992,574 A | * | 2/1935 | Jenkins ..................... | 174/72 C |
| 2,595,452 A | * | 5/1952 | Geist et al. ................ | 174/68.3 |
| 2,896,009 A | * | 7/1959 | Caveney .................... | 174/72 A |
| 3,126,444 A | * | 3/1964 | Taylor ........................ | 174/101 |
| 3,761,603 A | * | 9/1973 | Hays et al. ................. | 174/101 |
| 4,342,475 A | * | 8/1982 | Moran ..................... | 285/152.1 |
| 6,168,122 B1 | * | 1/2001 | Lobsiger et al. ........... | 248/68.1 |
| 6,402,536 B1 | * | 6/2002 | Tsukamoto et al. ......... | 439/211 |
| 6,437,243 B1 | * | 8/2002 | VanderVelde et al. ..... | 174/68.3 |
| 6,634,605 B1 | | 10/2003 | Bernard et al. | |
| 6,889,443 B1 | * | 5/2005 | Polk, Jr. ..................... | 33/562 |

* cited by examiner

*Primary Examiner*—Ramono Ramirez

(57) ABSTRACT

A ducting system for managing fiber optic, or other sorts of cabling. The duct has perforated circular punchouts in its sides. To drop cables to equipment below, the user simply punches out one of the circular perforated sections in the duct. This will leave a hole, which is sized to receive a downspout. Instead of punchouts, holes for the downspout could simply be drilled in the initial product. Regardless, the downspout is dropped to its full extent through and out of the duct through the hole, and is then retained by a grommet which bears against the interior of the duct. Once the downspout is secured in the hole, the selected cables are dropped from the duct through the hole, down the downspout, and into standard ribbed flex tubing, which may be force fit onto the downspout.

11 Claims, 4 Drawing Sheets

CABLE DUCT WITH PUNCHOUTS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of routing, protecting, and concealing cabling. More specifically, the present invention is relevant to the action of dropping cables from raceway duct systems.

BACKGROUND OF THE INVENTION

Raceway duct systems are used to route, protect and conceal cabling. This cabling may comprise data, voice, video, fiber optic, or power cabling. This type of duct system can have numerous configurations. The most typical kind of ducting occurs in longitudinal sections which have a trough and a lid. There are also a variety of other types of sections included with these systems, such as 90° elbows, 45° elbow fittings, t-fittings, four way intersections (or x-sections), and others. These systems often times run the cable through ducts which are run along the ceiling in a facility. The type of facility referred to might be, e.g., a telecommunications facility, or a computer equipment center office. These types of facilities often include numerous, often time hundreds or thousands of computing equipment racks. The duct work is used to deliver the cables to the appropriate pieces of equipment in these racks. Because the cabling is run along the ceiling of such facilities, the cabling must be "dropped" to the equipment.

The prior art techniques for dropping cable to equipment from a ceiling duct system are labor intensive and costly. The most common technique used to accomplish this is disclosed in prior art FIG. 1. Referring to the figure, we see a prior art fiber optic raceway system with a cable drop assembly 10. These types of prior art systems are used to drop cabling between two standard ducts. These ducts are first standard duct 12 and second standard duct 14. Each of these will be well known to those skilled in the art as common 4 inch trough-type ducts which are usually sold in 6 foot sections. These trough sections have 4 inch sides and a four inch floor (all in cross section). They are typically constructed in durable plastic and are rather thick. In fact, they are usually manufactured with a thickness of ⅛ inch, which makes this type of duct very durable. This protects the cable from trauma and fire. But its thickness makes it virtually impossible to cut with a standard utility knife, or other cutting equipment which might be available to technicians in the field.

The prior art methods involve the time consuming method of creating a drop at a junction between two existing in the ducts. Referring to FIG. 1, first and second ducts, 12 and 14 respectively, are normally connected using a single connector.

This kind of connector is often referred to as a junction kit by those skilled in the art. Junction kits are used snap fit two longitudinal sections together. For example, two 6 foot sections can be snapped together to form a continuous 12 foot section.

Occasionally, it will be necessary to access some of the cables running through the two sections and deliver them to equipment below. This equipment is usually located in what are known as telco or server racks.

FIG. 1 shows a prior art technique of dropping cables in such a circumstance. When it is necessary to drop a group of cables (a subcomponent of the plurality presently included in the duct) the technician will install a drop unit 16 in between ducts 12 and 14. Drop unit 16 is T-shaped and is used to drop the cables which have been separated from the bundle to be delivered to equipment below. The dropping occurs through a lower portion 18. Lower portion 18 enables the cable to run down to the equipment, e.g., server racks, routers, and other telecommunications or computing equipment. The techniques for doing this will be well known to those skilled in the art. T-shaped drop units like that shown as drop unit 16 are readily available in the market. Both ends of the "T" in junction 16 are connected to ducts 12 and 14 using a first junction kit 22 and a second junction kit 24, respectively. First junction kit 22 and second junction kit 24 are commercially available. They are each used to snap the junction in between the ducts. A third junction kit 26 may be used to connect the lower part of the T to a vertical duct 20. Vertical duct 20 may be used to direct the cabling downward to protectively access it to the equipment it is designated for.

After vertical duct 20, the cabling being dropped will be inserted into what is known to those skilled in the art as corrugated (or ribbed) split tubing. Corrugated split tubing comes having a one inch, two inch, or sometimes even three inch inside diameter. Thus, it forms a conduit having a smaller cross sectional smaller size than the ducts have. This split tubing is also split along its length to allow access for inserting and removing cables therefrom. It is used to direct the cables to their particular destinations in smaller bundles.

The installation of the drop cabling systems such as that shown in FIG. 1 is extremely time consuming. It may take the average technician over 24 hours to complete the drop of a small number of cables. This creates significant human resource issues and costs.

Another negative is the cost of these systems. The drop unit 16, and the three junction kits 22, 24, and 26 are somewhat expensive. Much more expansive than the simple straight ducting and split tubing. This in many cases, makes the FIG. 1 process, though effective in protecting the cabling, unreasonably expensive.

Besides the FIG. 1 system, another prior art technique exists. This alternative system is known commercially as an Express Exit™ system. It is sold by ADC, Inc. This ADC system lifts the selected cables, which are intended to be dropped out from above the duct. Once the dropped cables are raised out from above the duct, they are directed to specified equipment below in protective ducting or ribbed split tubing. The ADC product, however, has proved to be a difficult system to use. Especially in situations in which the space within the technician is allowed to work above the duct is limited. In many situations, the technician will be precluded from using the ADC system because there is insufficient work space above the duct (which typically runs along the ceiling of the facility). Furthermore, the installation of the ADC system has proven to be labor intensive, and it has significant part costs—much like the system disclosed in FIG. 1.

Therefore, there is a need in the art for a system that is much easier and less time consuming to use, but still allows for the adequate protection of cables being dropped out of an overhead, or otherwise placed duct.

SUMMARY OF THE INVENTION

The present invention overcomes the above-stated disadvantages in the prior art systems by providing a cable duct with apertures along its sides. The cable duct system of the present invention may also involve the use of knockout sections which form the apertures. The cable duct system (like most) is adapted to receive a plurality of cables. The duct itself has a longitudinal floor, a first longitudinally extending side, and a second longitudinally extending side opposing the first side, wherein one of the sides or the floor define an aperture for dropping a bundle of cables from the duct to equipment below it. The holes may be in the sides or floor of the duct, but preferably, are in the sides spaced apart so that cables can optionally be dropped at different positions.

Another novel feature of the cable duct system of the present invention is a downspout which is inserted through each of the holes in the duct. This downspout has first and second ends, the first end which is adapted to be inserted through the holes provided in the ducting and then cause to depend from the ducting. The downspout is also adapted to receive and guide at least one cable there through to make the dropping of the cables more convenient. The second end of the downspout has a grommet. The grommet retains the second end of the downspout by bearing against an internal surface of the duct. The first end of the downspout is sized so that it can be force fit into the internal surface of a standard piece of ribbed split tubing. Ribbed split tubing is standard in the industry, and the forced fit enables this tubing to be suspended along with the downspout from the duct. The fiber optic (or other kind of cable) is protectively held in all of these devices. The downspout can alternatively have any radius of curvature to meet the specifics of its environment. In one preferred embodiment disclosed herein, however, two downspouts are provided. One having a two-inch radius of curvature. The other having a three-inch radius of curvature. The two different sizes may be used together or separately to meet industry ideals.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides a system and method for managing the dropping of fiber-optic, or other sorts of cabling from a duct or other systems to the equipment with minimal cost and effort.

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

You will note the use of the terms aperture and hole throughout this application. Each of these terms is to be given it's broadest meaning. The terms are intended to include any type of opening. E.g., holes, gaps, or slits would all fall within the definitions of each of these terms. The use of either term should not be construed as imparting any specific shape unless otherwise specified.

Figure 1:
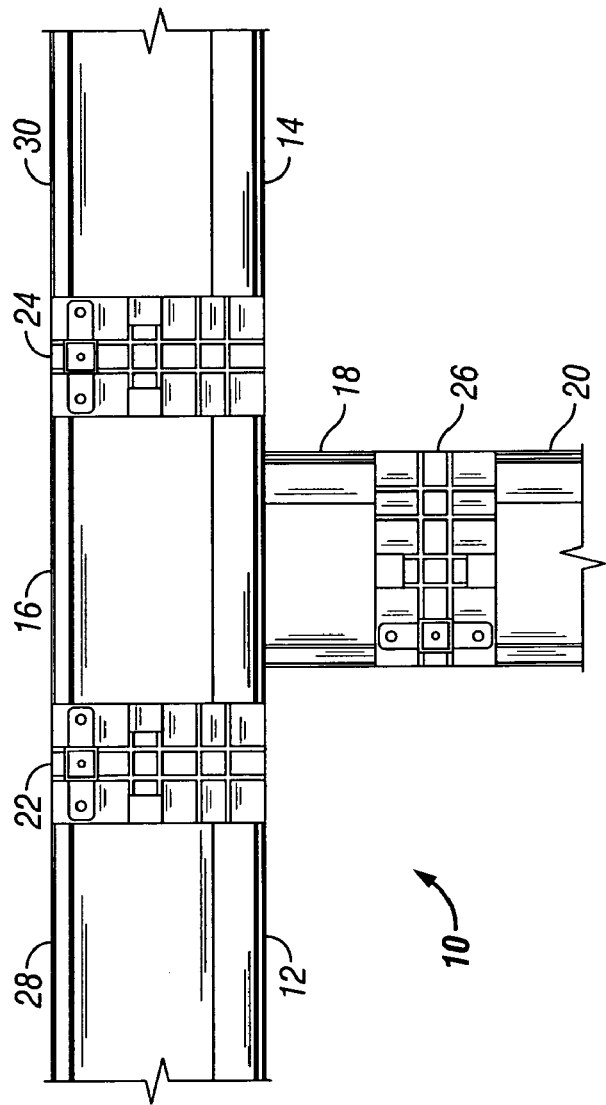
FIG. 1 is a side view of a conventional system for dropping cable from a fiber-optic cable raceway.
Figure 2:
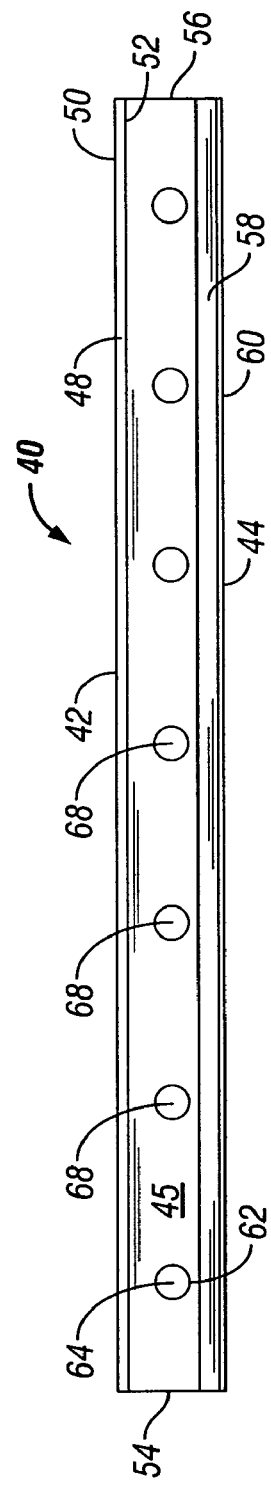
FIG. 2 is a side view of the duct of the present invention.
Figure 3:
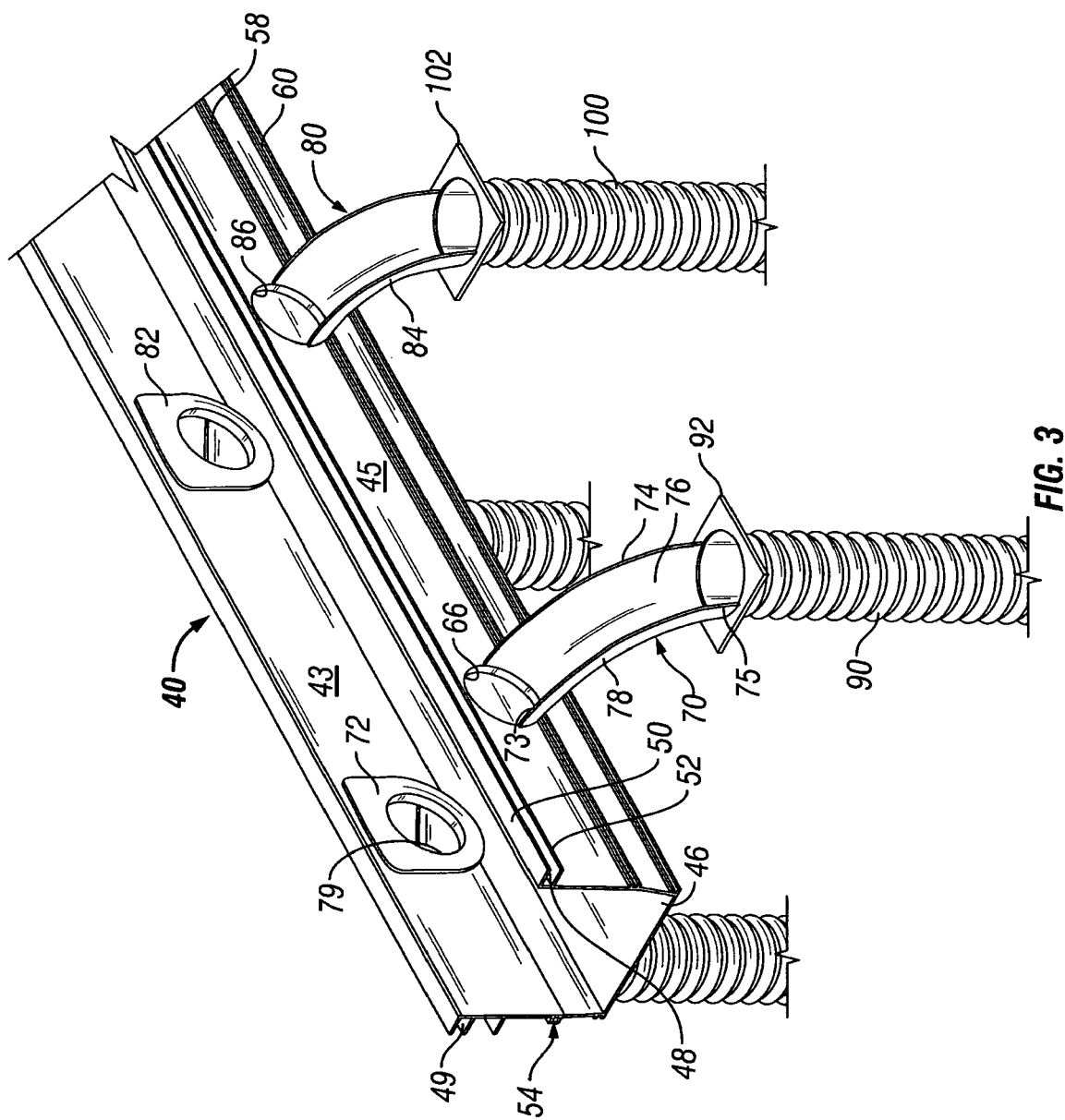
FIG. 3 is a perspective view of one end of the duct of the present invention in use enabling the dropping of cables to computing equipment.

FIGS. 2 through 5 show the duct system of the present invention. FIG. 2 shows a side view of one section of a duct 40 of the present invention. This duct will be very similar to ducts known to those skilled in the art, except that it is provided with knockout portions (see 64 and 68) which may be physically removed by force to form apertures (not pictured in FIG. 2). These resulting apertures may be seen in FIG. 3. Referring to FIG. 3, we see the apertures 66 and 86 exist, in the depicted embodiment, in the sides of the duct. They will be used to remove and drop cables from the duct 40 in a method to be described hereinafter.

Structurally speaking, the duct has a trough shape. As can be seen from FIGS. 2–5, the duct 40 comprises an upper portion 42 and a lower portion 44. It also has two ends 54 and 56. In cross section, the duct can be seen to have a first side 43 and a second side 45. The duct also has a floor 46 which along with sides 43 and 45 defines the trough shape of the duct. The bulk of the cabling will be run through the trough. The trough is defined by three longitudinal walls—the sides 43 and 45 and the floor 46.

Provided on top of the duct, a lid is installed (not pictured). The lid snaps onto and closes off the top of the trough along its entire length. It can be snapped on or off to create access to the cables included in the trough. These lids are well known to those skilled in the art, and are the most conventional way to top off the duct. The snapping in of the lid is done into lid-receiving channels. A first lid receiving channel 48 travels along the top of longitudinally extending side 45. An identical lid receiving channel extends along the upper part of the longitudinally extending opposite side 43 of the duct. Channel 48 is defined by a first ridge 50 and a second ridge 52 formed on the second side 45 of the duct. An identical arrangement is disposed on the other side 43 (not specifically labeled). In inwardly formed member on each side of the lid is used to snap in on top of the duct in a fashion that will be well known to those skilled in the art.

Side 45 also has a first plurality of reinforcing ribs 58 and a second plurality of reinforcing ribs 60 below the first plurality. These are used to reinforce the duct and give it more structural integrity.

In FIG. 2 it may be seen that a knock out portion 64 in side 45 is provided by creating an outline of weakness around the portion 64 to define it. Here, in the preferred embodiment, perforations 62 have been used. The perforations 62 make knock out portion 64 easily removable form the ⅛ inch duct wall by a users fingers. The user simply pushes against portion 64 to snap it out of the duct.

It is import ant to note that other methods of weakening the duct wall, other than perforating it, could be employed to form the outline of weakness. For example, the wall could simply be thinned out along the outline. Chemical agents could also be employed to chemically weaken the outline.

Alternatively still, simple holes could be drilled into the duct instead of creating knocked out portions. These holes could simply be pre-manufactured as part of the molding process, or actively removed through drilling. Other cutting processes could be used instead.

Portion 64 is not the only knockout portion in the duct of the present invention. There are also a plurality of knocked out portions with weakened outlines 68 which run down the rest of side 45 of the duct. These knock outs are the same as portion 64.

There are also knockouts on back side 43. Though not pictured in FIG. 2, the opposite side 43 of duct 40 possesses the same kinds of knock out portions shown on side 45. formed by weakened outlines. Though these are not pictured in FIG. 2, there are evident in FIGS. 3 through 5. The embodiment shown in FIGS. 2 through 5 shows the same duct 40 of FIG. 2, except that the knock-out portions (alternatively preformed holes) on both sides 43 and 45 of duct 40 have been removed.

Though FIGS. 2–5 show an embodiment in which both sides of the duct have knockouts, it will be recognized that knockouts or simple holes could be placed on only one side of the duct rather than both. It is also possible that fewer numbers or more of these knock out portions or holes could be provided on either side of the duct. Knockouts could even be provided in the floor 46 of the duct 40.

Duct 40 of the present invention could be used alone, as it is pictured in FIG. 2 with cables being removed through the duct through the holes directly into split tubing and then run to the equipment as desired.

The preferred embodiment is provided, however, with optional downspouts. These downspouts are used to protectively conduct the cabling into the split tubing. A first downspout 70 is disclosed in FIGS. 3 through 5. This downspout has a 3 inch radius of curvature. This particular radius of curvature enables the spout to be more practical for use in common cable running applications. E.g., for use with particular server-rack arrangements.

Downspout 70 has essentially two parts. A grommet 71 (see FIG. 4, grommet 71 is not shown in FIGS. 3 and 5) and a spout 74. Grommet 71 defines a hole through which the dropped cables will be run. This hole, though not particularly visible in the figures, is the same as a hole 79 defined through an opposite downspout 77. The grommet 71 serves to retain downspout 70 into the duct from within. To do so, grommet 71 bears against the inside surface of the duct to hold the downspout within it. Spout 74 is used to fit through aperture 62 and includes a guide channel defined by a surface 76. The top of spout 76 has been removed, thus the cable or cables will be exposed above where enter into corrugated split tubing 90 as shown. The selected fibers/cables will be slid down this channel defined by surface 76 and thus partially exposed before being dropped into corrugated split-tubing in a manner which will be described hereinafter. It also protects the cable which is run through it.

Figure 4:
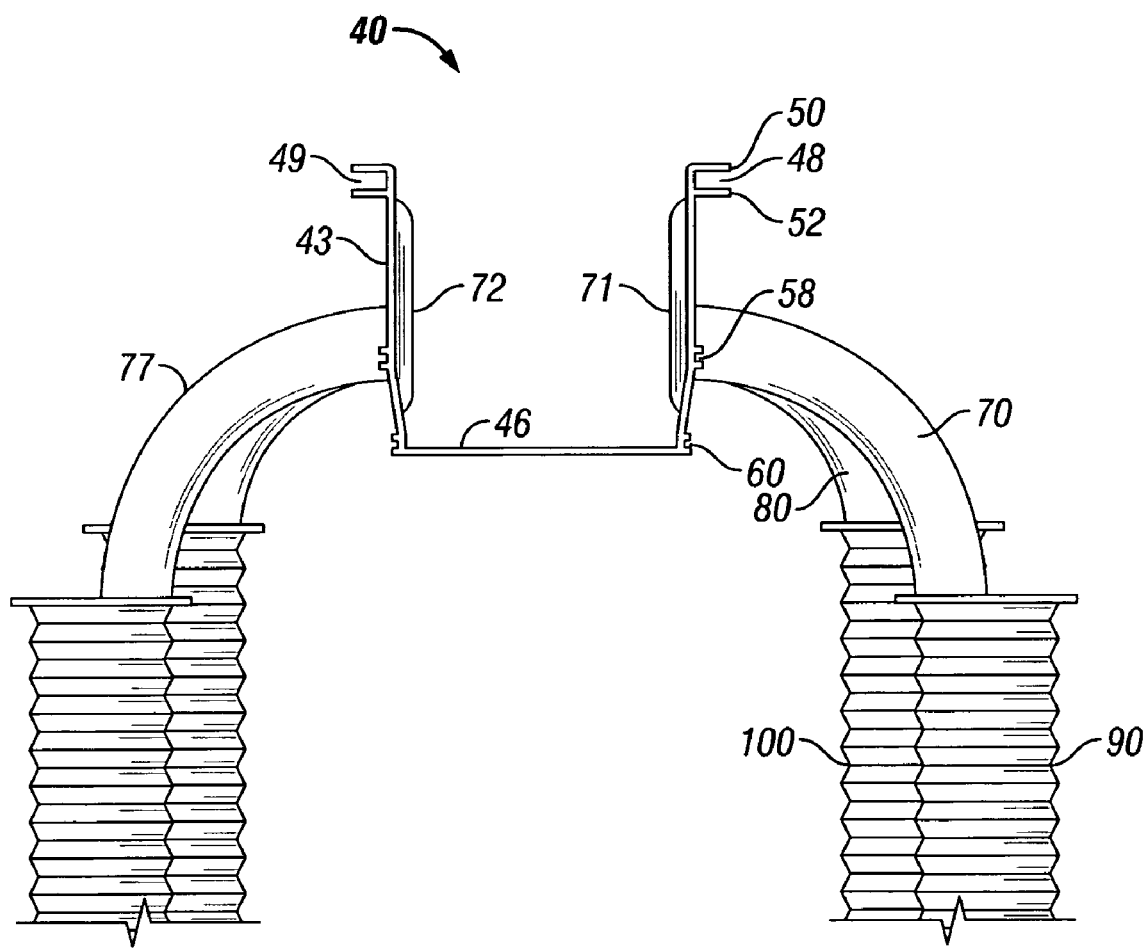
FIG. 4 is an end view of one end of the duct of the present invention in use enabling the dropping of cables to computing equipment.

Downspout 70 is installed into the duct by inserting a first end 75 of the downspout through hole 66 and sliding the downspout through the hole until the inside surface of grommet 71 engages the inside surface of the duct, as can be seen in FIG. 4.

Figure 5:
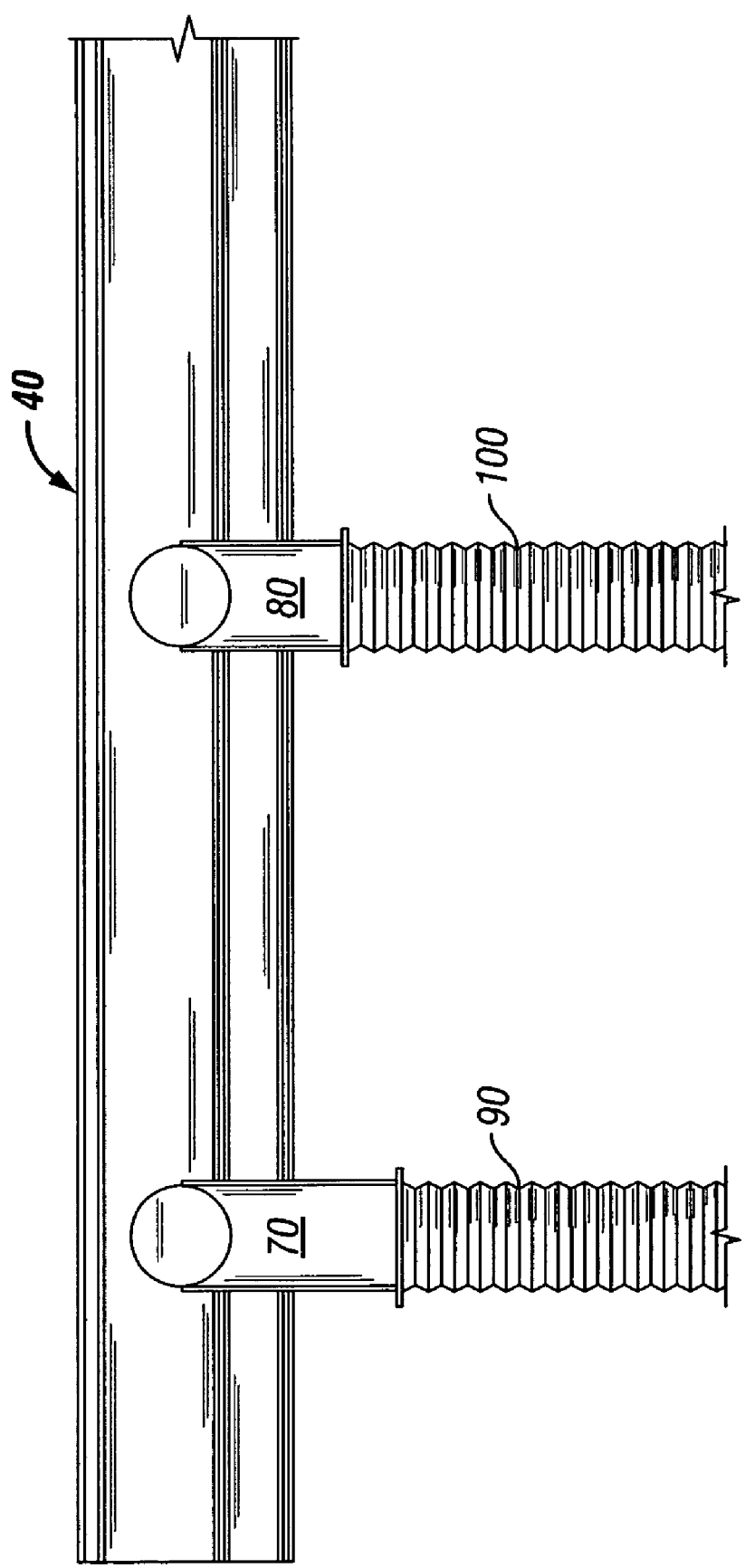
FIG. 5 is a side view of one end of the duct of the present invention in use enabling the dropping of cables to computing equipment.

FIG. 4, as well as FIGS. 3 and 5 shown that the opposite side 43 of the duct 40 includes a downspout 77 which extends from the other side of the duct. See FIG. 4. It has a grommet 72, just like grommet 71 of downspout 70. In fact, downspout 77 is essentially a mirror image of downspout 70, and is installed in the same manner as well.

The spout 74 of downspout 70 has a cable receiving inside surface 76. The downspout 70 is adapted to receive the cable and drop it into a split tubing 90 shown below. First end 71 of the spout is adapted with a radius which makes it able to be force fit within the standard inside diameter of a typical split tubing, e.g., split tubing 90. For installation purposes, the downspout is slid into through hole 66, then the selected cables to be dropped at that point are slid down cable receiving inside surface 76 into split tubing 90, and then an outside surface 78 of spout 74 is forcibly slid into the split tubing 90. Because the radius of outside surface 78 is slightly greater than the inner diameter of split tubing 90, the force fit will be enabled.

A second downspout 80 with a 2 inch radius of curvature is disclosed being installed through a second hole 86 in duct 40. This downspout 80, like the first downspout, will have a grommet like that disclosed for downspout 70. Though the grommet on downspout 80 is not shown, it would be the same as grommet 82 shown on a downspout opposite (in side 43). This not-pictured grommet will retain downspout 80 within the duct in the same manner disclosed for downspout 70 already. Essentially, downspout 80 is identical to downspout 70, except that its radius of curvature has been minimize. This makes it more apt for different applications. For example, it may be advantageous with some server-rack configurations to drop the cabling more tightly to the duct. One skilled in the art will recognize that different radii of curvature for different downspouts could be used for different kinds of applications in order to drop cabling at different distances from duct 40. All of these different curvatures and displacements should be considered within the scope of the present invention, and the present invention is not of course limited to the two radii of curvature identified here. Other radii or even configurations could be used and still fall within the scope of the present invention.

Though the installation techniques used with the present invention may be already somewhat evident, they are essentially the steps of first creating the apertures (or knockouts) in one of said sides or floor. You could put the apertures anywhere. In one of the sides, or in the floor. But as can be seen in FIGS. 2–5, the preferred embodiment has holes spaced along both sides (43 and 45) of the duct 40. These holes may be formed as premanufactured or drilled holes, or as the result of knockouts described above.

Once the duct is installed, normally at the ceiling of a facility, it will be likely that a systems administrator will eventually have to drop groups of cables from the duct. To do so, the user will simply physically remove a knockout proximate a location into which a single, or a plurality of cables need to be dropped. The knocked out portion of the duct, when removed, will create an aperture at the place a group of cables is to be dropped. If the holes are premanufactured or predrilled into the duct walls, this step will not be necessary.

After the hole has been created, in the preferred method, a downspout will be installed. This is done by removing the lid, if this has not yet been done, and then inserting the spout portion, e.g., first end 75 of spout 70 through the aperture 66 created. The insertion is done by first positioning the downspout 70 such that it is curved upward. After its full insertion, it will then be curved downward such that it depends from the duct. It will be held in by the grommet 71.

Once the downspout 70 has been fully inserted, the split tubing 90 can be forced fit around the spout at first end 75. As described above, this is a forced fit. The spout will then be securely held within the tubing. Tubing 90 will then be run to the equipment in a manner known to those skilled in the art.

Now that the spout and tubing have been installed, the user is ready to run the cable intended to be dropped. This is done by simply snaking it from inside the duct, though the spout, down the tubing, and to the equipment where it will be connected.

Once the necessary connections have been made, the remaining cables from the duct are resituated in the duct, and the lid is reinstalled. The process is then complete.

Again, the ducting system of the present invention is a significant improvement over the prior art available. The ducting of such systems is typically of such a thickness, e.g., at least ⅛ inch thick, such that it is difficult if not impossible to cut through it with a utility knife of other tool used by a technician in the field. The knock outs, or alternatively drilled holes, enable the user to gain access at any point along the duct if necessary in order to drop fibers. This gives the technician great levity in terms of accessing different cables at different points and then dropping them to equipment as desired.

As can be seen, the present invention and its equivalents are well adapted to provide a new and useful equipment housing which may be used to monitor equipment. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A cable duct adapted to receive a plurality of fiber optic cables, said plurality including a first cable and a second cable, said duct comprising:
    a longitudinal floor;
    a first longitudinally extending side; and
    a second longitudinally extending side opposing said first side;
    said first side defining a first aperture for dropping said first cable from said duct;
    a first curved downspout having first and second ends, the first end of said first downspout adapted to be inserted through said first aperture thus causing said first downspout to depend outward and away from said duct;
    said second end of said first downspout adapted to depend from an internally positioned grommet, wherein said grommet bears against the inside surface of said duct thus retaining said first downspout from within said duct; and
    said first downspout having a receiving surface defining a guide channel, said guide channel being adapted to receive said first cable such that said first cable is able to be dropped down and be connected to a first piece of equipment below.

2. The cable duct of claim 1 comprising:
    a snap-on lid for covering said duct.

3. The cable duct of claim 1 wherein a second aperture is defined by said second side of said duct for dropping said second cable therefrom.

4. The cable duct of claim 3 comprising:
    a second downspout having first and second ends, the first end of said second downspout being adapted to be insertable through said second aperture and then caused to depend from said duct, said downspout further adapted to receive and guide said second cable to a second piece of equipment below.

5. The cable duct of claim 1, wherein said first end of said first downspout is sized such that it may be force fit into an inner surface of a standard piece of ribbed split tubing.

6. The cable duct of claim 1, wherein said first downspout has a 2 inch radius of curvature.

7. The cable duct of claim 1, wherein said first downspout has a 3 inch radius of curvature.

8. The cable duct of claim 1, wherein said first downspout has a removed upper portion which causes at least a portion of said first cable to be exposed as it travels through said guide channel.

9. The cable duct of claim 1, wherein each of said first and second sides of said duct have a plurality of apertures substantially identical to said first aperture, and each of said apertures in said plurality of apertures has an associated downspout substantially similar to said first downspout, said plurality of downspouts adapted to deliver a plurality of cables to additional equipment below.

10. A cable duct adapted to receive a plurality of cables, said duct comprising:
    a longitudinal floor;
    a first longitudinally extending side;
    a second longitudinally extending side opposing said first side;
    an outline of weakness surrounding a removable portion in one of said sides or floor, said removable portion, when removed, defining an aperture for rerouting at least one cable of said plurality from said duct using a curved downspout; and
    said downspout being adapted to depend from an internally positioned grommet and curving out and away from said duct, wherein said grommet bears against the inside surface of said duct thus retaining said downspout from within said duct.

11. The cable duct of claim 10, wherein said outline of weakness comprises perforations.

* * * * *